United States Patent
Lee et al.

(10) Patent No.: US 7,636,286 B2
(45) Date of Patent: Dec. 22, 2009

(54) FRONT PHOTO DETECTOR HAVING NO GAIN SELECTION SWITCH, OPTICAL PICK-UP INCLUDING THE FRONT PHOTO DETECTOR, AND OPTICAL RECORDING AND/OR PLAYING APPARATUS INCLUDING THE FRONT PHOTO DETECTOR

(75) Inventors: Hong-kyu Lee, Seoul (KR); Hee-dong Kim, Suwon-si (KR); Pyong-yong Seong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 622 days.

(21) Appl. No.: 10/792,917

(22) Filed: Mar. 5, 2004

(65) Prior Publication Data
US 2005/0025023 A1 Feb. 3, 2005

(30) Foreign Application Priority Data
Mar. 7, 2003 (KR) ............... 10-2003-0014477

(51) Int. Cl.
*G11B 7/00* (2006.01)
(52) U.S. Cl. ............... 369/53.26; 250/214; 250/201.5; 369/116; 369/120
(58) Field of Classification Search ............... 369/116; 250/201.5, 114
See application file for complete search history.

(56) References Cited

U.S. PATENT DOCUMENTS 5,036,505 A * 7/1991 Gleim ............... 369/44.25
5,247,501 A * 9/1993 Hashimoto et al. ........ 369/44.11
5,966,237 A * 10/1999 Sugaya et al. .......... 359/341.41
5,981,936 A * 11/1999 Fujiie ............... 250/214 A
6,404,709 B1 * 6/2002 Kouno ............... 369/44.23
6,504,799 B1 * 1/2003 Yamashita et al. ....... 369/44.11
6,855,919 B2 * 2/2005 Taguchi ............... 250/205
7,068,933 B2 * 6/2006 Seong et al. ............ 398/33

(Continued)

FOREIGN PATENT DOCUMENTS

JP 2000-251300 9/2000

(Continued)

OTHER PUBLICATIONS

Machine Translation of Japan Publication No. 20001202646 by Doi Takeshi in Jul. 27, 2001.*

(Continued)

*Primary Examiner*—Wayne R Young
*Assistant Examiner*—Linh T Nguyen
(74) *Attorney, Agent, or Firm*—Staas & Halsey LLP

(57) ABSTRACT

A front photo detector (FPD) of an optical pick-up for an optical recording and playing apparatus having no gain selection switch, a simplified configuration, an improved prevention of an abnormal operation due to an error in gain selection, and improved reliability. The front photo detector includes a photo diode unit, a current-voltage amplifying circuit, and a voltage amplifying unit. The photo diode unit outputs current proportional to the power of the light emitted from one of a plurality of laser diodes. The current-voltage amplifying circuit converts the current output from the photo diode unit into a voltage. The voltage amplifying circuit amplifies the voltage output from the current-voltage amplifying circuit by a predetermined gain.

15 Claims, 4 Drawing Sheets

U.S. PATENT DOCUMENTS

| | | | |
|---|---|---|---|
| 7,415,053 B2 * | 8/2008 | Hayashi | 372/38.02 |
| 2002/0014849 A1 * | 2/2002 | Tsujikawa et al. | 315/169.1 |
| 2005/0061954 A1 * | 3/2005 | Itoh et al. | 250/214 A |

FOREIGN PATENT DOCUMENTS

| | | |
|---|---|---|
| JP | 2001-202646 | 7/2001 |

OTHER PUBLICATIONS

Machine Translation of Japan Publcation No. 2000251300 by Okamatsu Kazuhiko in Sep. 14, 2000.*

Office Action issued by the Korean Patent Office on Mar. 29, 2005 in Korean Application No. 10-2003-0014477.

* cited by examiner

FRONT PHOTO DETECTOR HAVING NO GAIN SELECTION SWITCH, OPTICAL PICK-UP INCLUDING THE FRONT PHOTO DETECTOR, AND OPTICAL RECORDING AND/OR PLAYING APPARATUS INCLUDING THE FRONT PHOTO DETECTOR

CROSS-REFERENCE TO RELATED APPLICATIONS

This application claims the priority of Korean Patent Application No. 2003-14477, filed on Mar. 7, 2003, in the Korean Intellectual Property Office, the disclosure of which is hereby incorporated by reference.

BACKGROUND OF THE INVENTION

1. Field of the Invention

The present invention relates to a front photo detector (FPD) for an optical pick-up, and more particularly, to an FPD for an optical pick-up that does not need a gain selection switch and thus does not need to control gain selection and prevents an abnormal operation due to gain selection, thereby having improved reliability.

2. Description of the Related Art

A laser diode is used as a light source for an optical pick-up of an optical recording and playing apparatus such as a compact disc (CD) player, a CD-Recordable drive, or a CD-ReWritable drive. To ensure the smooth operation of the optical recording and playing apparatus, the power of the laser diode should be stabilized; however, this is difficult because the power of the laser diode changes significantly with temperature and period of use. To maintain the power of the laser diode at a proper level, power control is required; therefore a laser diode power control device is included in the optical pick-up.

The laser diode power control device in the optical pick-up of the optical recording and/or playing apparatus includes an FPD and an automatic power control (APC) circuit. The FPD receives a portion of the light emitted from the laser diode of the optical pick-up by using a photo diode, converts current that is generated from the photo diode in proportion to the power of the received light into a voltage by using a current-voltage amplifying circuit, amplifies the converted voltage by using a voltage amplifying circuit, and outputs the amplified voltage to the APC circuit. The FPD is generally used to obtain a monitoring voltage for recording power control.

The APC circuit receives an output voltage of the FPD, compensates for a difference between the output voltage and a predetermined reference voltage, and outputs a proper laser diode driving current.

FIG. 1 is a circuit diagram of a conventional FPD.

Referring to FIG. 1, an FPD 100 includes a photo diode 101, a current-voltage amplifying circuit 110, and a voltage amplifying circuit 120. The photo diode 101 receives a portion of a light emitted for recording from a laser diode and generates a current that is proportional to the power of the received light. The current-voltage amplifying circuit 110 converts the current generated by the photo diode 101 into a voltage. The voltage amplifying circuit 120 amplifies the input voltage from the current-voltage amplifying circuit 110 by a predetermined gain.

Vref denotes a reference voltage input to amplifiers 125 of the current-voltage amplifying circuit 110 and the voltage amplifying circuit 120.

A gain of the voltage amplifying circuit 120 can be adjusted by adjusting input resistances that are adjusted by adjusting a variable resistor VR disposed at an input terminal of the voltage amplifying circuit 120. The variable resistor VR is adjusted before being released into the market. Such adjustment is designed to output the same voltage to an APC circuit when the same light power is input to the FPD 100.

FIG. 2 is a circuit diagram of a conventional FPD of an optical pick-up in which two laser diodes are used.

FIG. 1 shows the FPD 100 of an optical pick-up that uses a single laser diode, e.g., an optical pick-up that only performs recording/reproducing with respect to CDs. In contrast, FIG. 2 shows an FPD 200 of an optical pick-up in which two laser diodes that emit lights of different wavelengths are selectively used to perform recording/reproducing with respect to CDs and DVDs.

As shown in FIG. 2, the FPD 200 includes a photo diode 201, a current-voltage amplifying circuit 210, and a voltage amplifying circuit 220. The photo diode 201 receives a portion of light from a selected laser diode that emits light for recording and generates current that is proportional to the power of the light emitted from the selected laser diode. The current-voltage amplifying circuit 210 converts the current generated by the photo diode 201 into a voltage. The voltage amplifying circuit 220 amplifies the voltage input from the current-voltage amplifying circuit 210 by a predetermined gain.

Unlike the current-voltage amplifying circuit 110 of FIG. 1, a current-voltage amplifying circuit 210 of FIG. 2 includes two feedback resistors R1 and R2 that can be selectively used. Also, unlike the voltage amplifying circuit 120 of FIG. 1, a voltage amplifying circuit 220 of FIG. 2 includes two input variable resistors VR1 and VR2 that can be selectively used.

Selecting one of the two feedback resistors R1 and R2 or one of the two variable resistors VR1 and VR2 is performed by a gain selection switch 230. The gain selection switch 230 operates with a selection signal input from a control unit of the optical recording and playing apparatus. The selection signal is output from the control unit to the gain selection switch 230 after the control unit identifies the type of a currently used recording medium, so that a gain corresponding to the identified recording medium can be selected.

In FIG. 2, the feedback resistor R2 and the input variable resistor VR2 are selected. Alternatively, the feedback resistor R1 and the input variable resistor VR1 may be selected.

The wavelength of the light emitted from a laser diode for CDs is approximately 650 nm, while the wavelength of the light emitted from a laser diode for DVDs is approximately 780 nm. Also, the power of the emitted light for the laser diode for CDs is different from the laser diode for DVDs. Thus, the sensitivity of a conventional FPD 200 should be changed according to whether the laser diode for CDs or the laser diode for DVDs is being used. That is, the voltage output from FPD 200 should be different even if the same power is input. Therefore, during product manufacturing, an input variable resistor for CDs and an input variable resistor for DVDs are separately adjusted to respectively control gains depending on whether the laser diode for CDs is used or the laser diode for DVDs is used.

As shown in FIG. 2, the conventional FPD 200 necessarily includes the gain selection switch 230 and inputs the selection signal output from the control unit to the gain selection switch 230 after the type of the currently used recording medium is identified; thereby, selectively using one of the feedback resistors R1 and R2 and one of the input variable resistors VR1 and VR2 that are suitable for the currently used recording medium.

Thus, the gain selection switch 230 has to be included in the conventional FPD 200 and a separate signal line has to be connected to the gain selection switch 230 from the control unit, resulting in a complicated configuration. Further, due to possible noise in the selection signal, there may be an abnormal operation in gain selection.

SUMMARY OF THE INVENTION

The present invention provides an FPD that does not need a gain selection switch, thereby having a simple configuration.

The present invention also provides an FPD that prevents an abnormal operation due to an error in gain selection, thereby having improved reliability.

According to one aspect of the present invention, there is provided a front photo detector (FPD) for an optical pick-up, wherein the front photo detector comprises a photo diode unit that outputs current proportional to a power of light emitted from one of a plurality of laser diodes, a current-voltage amplifying circuit that converts the current output from the photo diode unit into a voltage, and a voltage amplifying circuit that amplifies the voltage output from the current-voltage amplifying circuit by a predetermined gain.

The photo diode unit comprises an optical device that changes a direction of the light emitted from one of the plurality of laser diodes and photo diodes that receive lights that are emitted from each of the plurality of laser diodes and pass through the optical device.

The current-voltage amplifying circuit comprises current-voltage amplifying units, each of which converts current output from each of the photo diodes into a voltage.

The voltage amplifying circuit separately controls a gain with respect to the current output from each of the current-voltage amplifying circuits.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Figure 1:
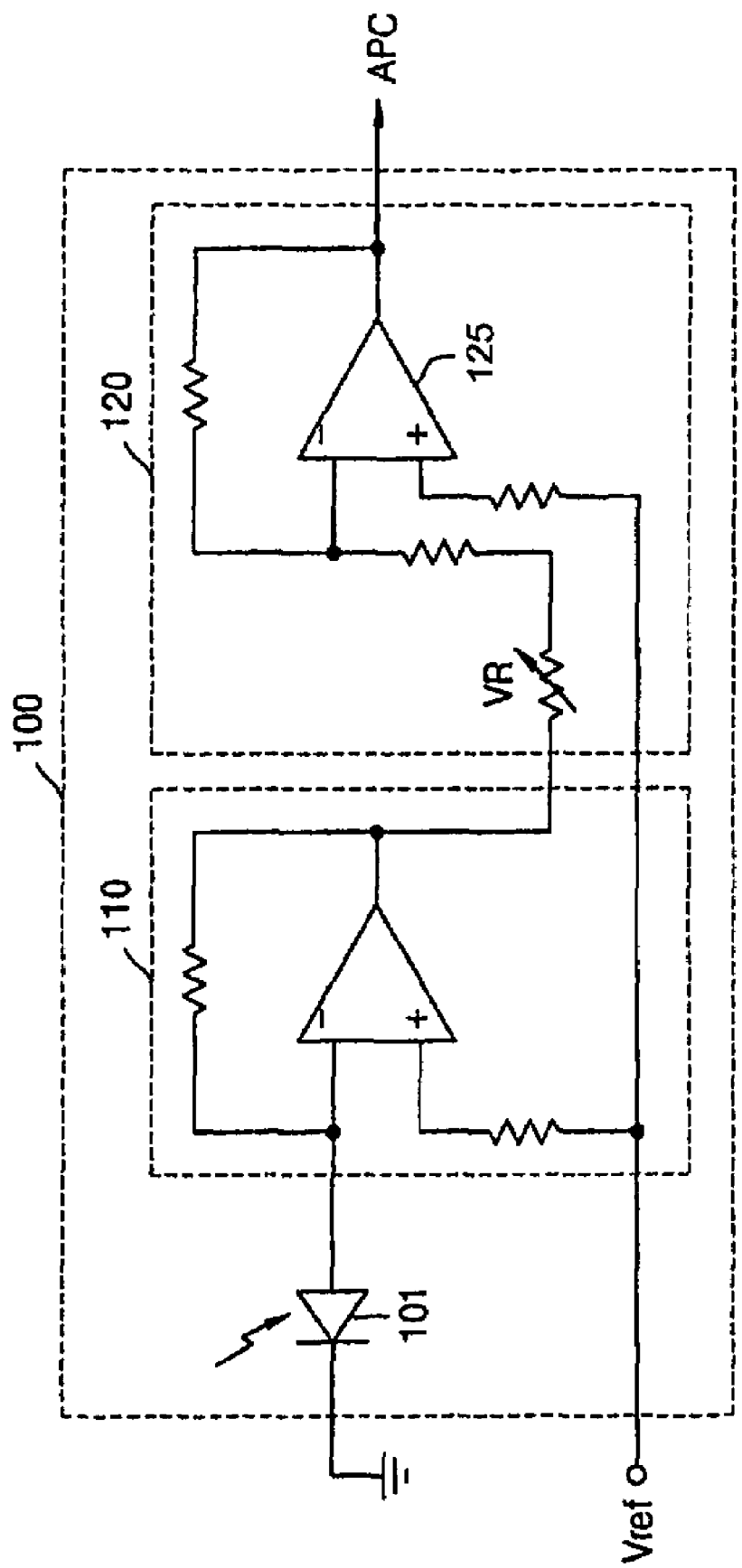
FIG. 1 is a circuit diagram of a conventional FPD of an optical pick-up in which a single laser diode is used.
Figure 2:
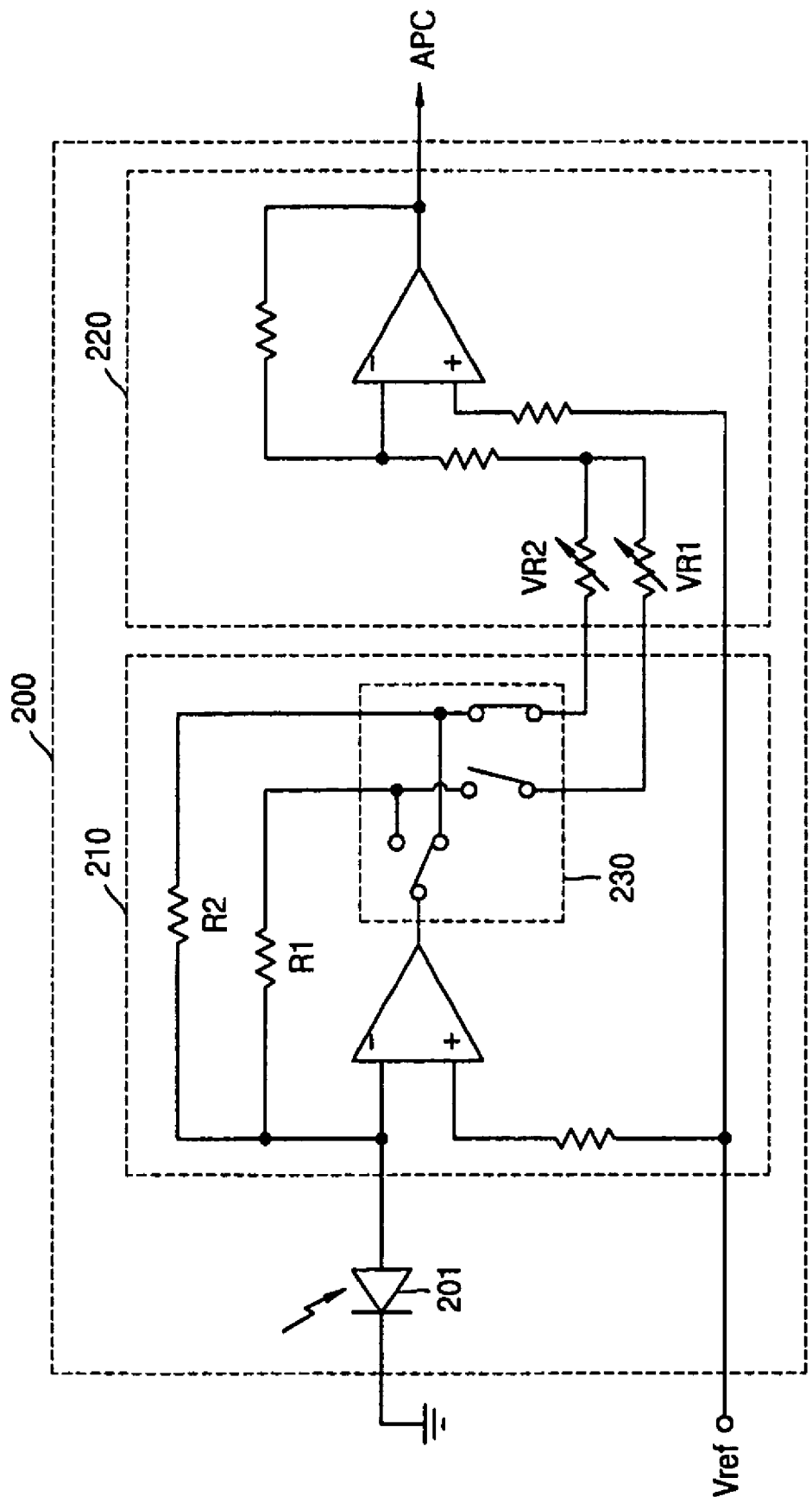
FIG. 2 is a circuit diagram of a conventional FPD of an optical pick-up in which two laser diodes are used.

The present invention will now be described more fully with reference to the accompanying drawings, in which embodiments of the invention are shown. Throughout the drawings, like reference numerals refer to the like elements throughout. The embodiments are described below to explain the present invention by referring to the figures.

Figure 3:
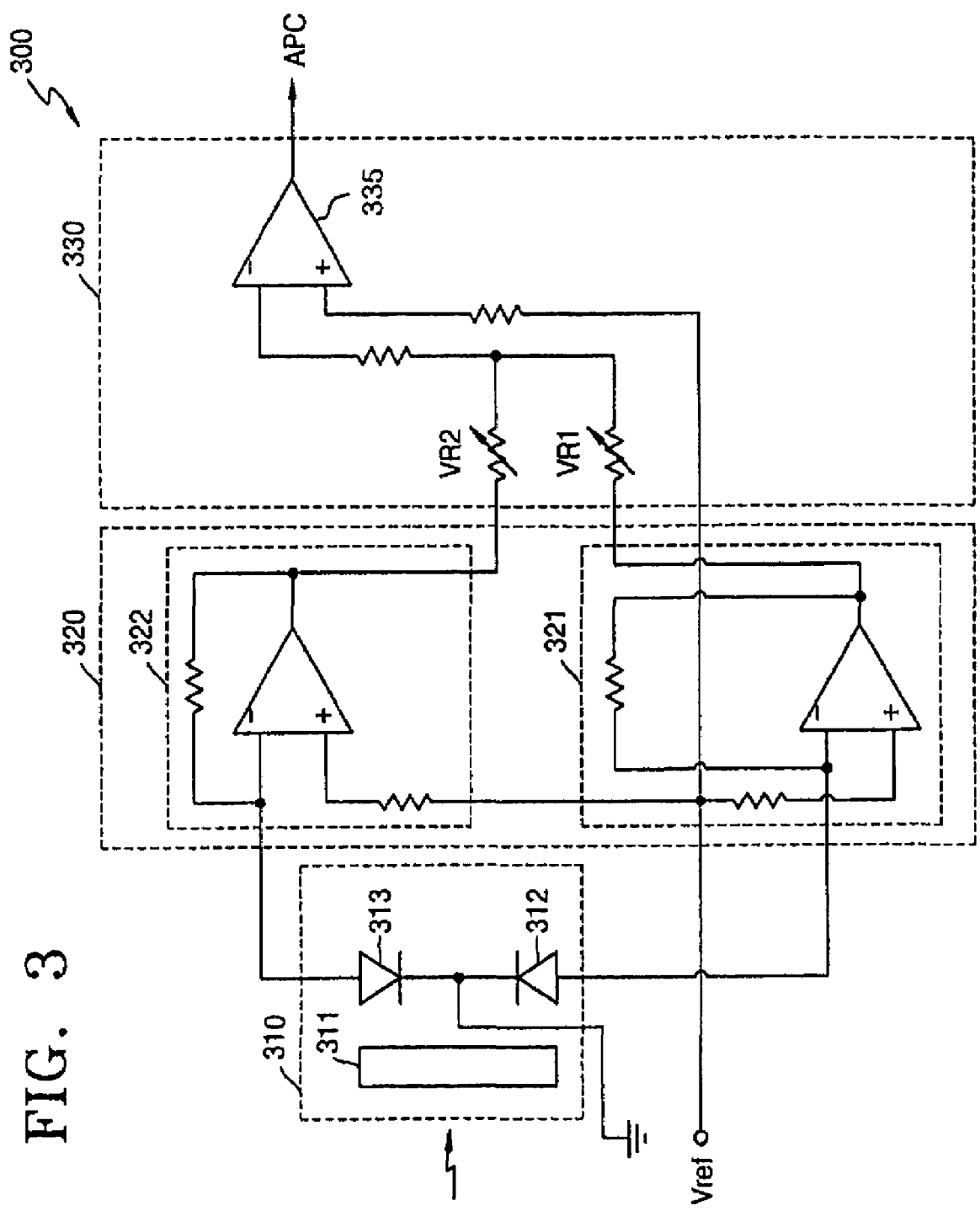
FIG. 3 is a circuit diagram of an FPD in which two laser diodes are used, according to an embodiment of the invention.

FIG. 3 is a circuit diagram of an FPD 300 according to an embodiment of the present invention.

The FPD 300 of the present invention is applied when a plurality of laser diodes is used. In FIG. 3, for example, two laser diodes, i.e., a first laser diode and a second laser diode are used.

In this embodiment, the FPD 300 includes a photo diode unit 310, a current-voltage amplifying circuit 320, and a voltage amplifying circuit 330. The photo diode unit 310 outputs a current that is proportional to the power of the light emitted from the first laser diode or the second laser diode. The current-voltage amplifying circuit 320 converts the current output from the photo diode unit 310 into a voltage. The voltage amplifying circuit 330 amplifies the voltage output from the current-voltage amplifying circuit 320 by a predetermined gain.

The photo diode unit 310 includes an optical device 311 for changing the direction of the light emitted from the first laser diode or the second laser diode.

The optical device 311 operates because the wavelengths of the lights emitted from the first laser diode and the second laser diode are different from each other and, as a result, within the same medium, the refractive indices of the lights emitted from the first laser diode and the second laser diode are also different from each other.

The optical device 311 may include a prism that directs lights incident through the same path to travel in different paths according to the wavelengths of the lights. Also, the optical device 311 may include a hologram or a grating that functions similarly to the prism.

The light that is emitted from the first laser diode and passes through the optical device 311 is received by a first photo diode 312. The light that is emitted from the second laser diode and then passes through the optical device 311 is received by a second photo diode 313.

The current-voltage amplifying circuit 320 includes a first current-voltage amplifying unit 321 and a second current-voltage amplifying unit 322. The first current-voltage amplifying unit 321 converts a current output from the first photo diode 312 into a voltage and the second current-voltage amplifying unit 322 converts a current output from the second photo diode 313 into a voltage.

The voltage amplifying circuit 330 is configured to separately set a gain with respect to an output of the first current-voltage amplifying unit 321 and a gain with respect to an output of the second current-voltage amplifying unit 322.

In FIG. 3, a single amplifier 335 is used, and a first input variable resistor VR1 connected to the output of the first current-voltage amplifying unit 321 and a second input variable resistor VR2 connected to the output of the second current-voltage amplifying unit 322 are different.

Figure 4:
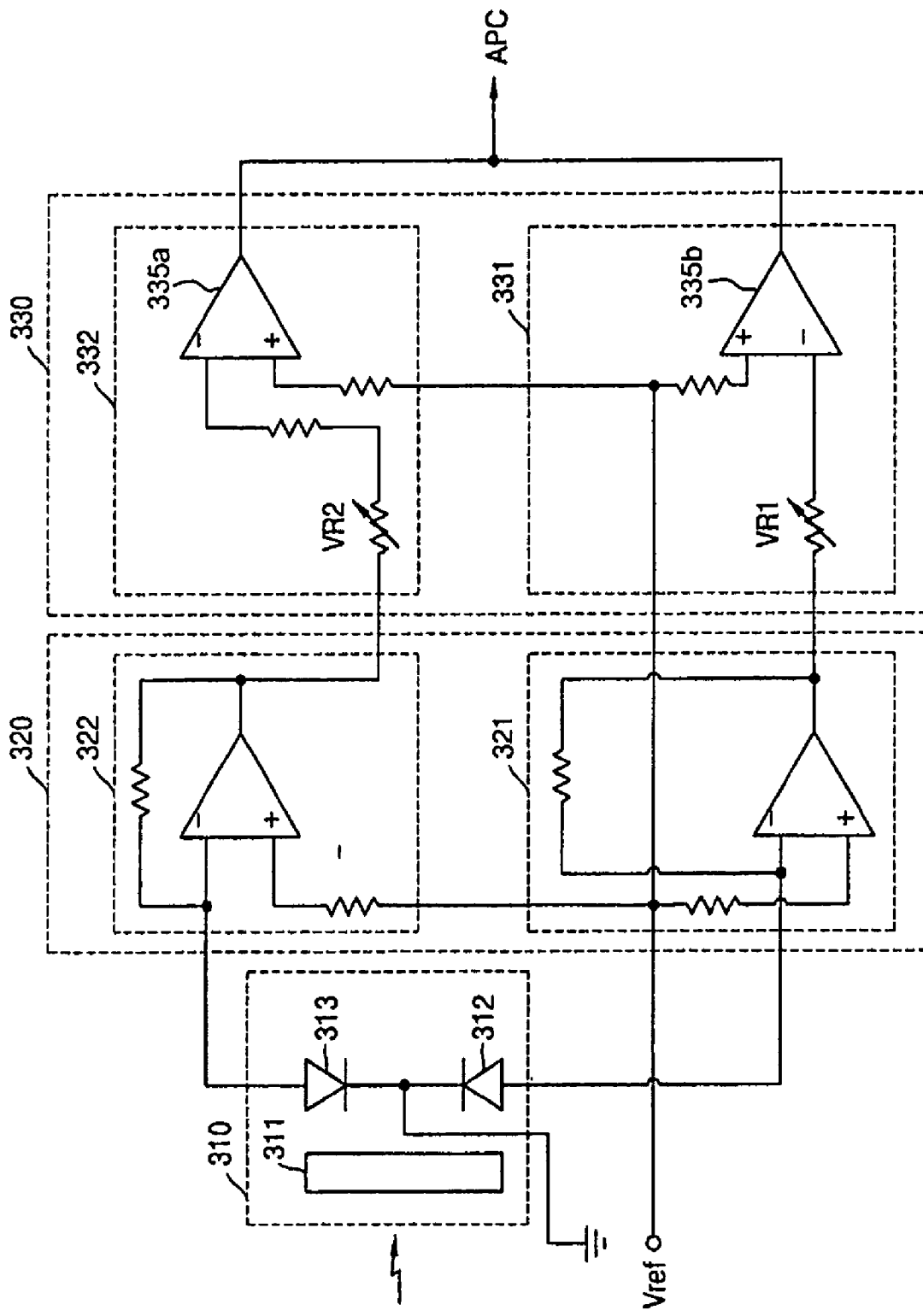
FIG. 4 is a circuit diagram of an FPD in which two laser diodes are used, according to another embodiment of the invention.

Meanwhile, as shown in FIG. 4, two amplifiers 335a, 335b may be used. In this case, a first voltage amplifying circuit 331 is connected to the first current-voltage amplifying unit 321 and a second voltage amplifying circuit 332 is connected to the second current-voltage amplifying unit 322.

Hereinafter, the operation of the FPD 300 will be described.

The first laser diode may be used to emit a light for CD recording and the second laser diode may be used to emit a light for DVD recording. During manufacturing of the optical pick-up, the gain of the FPD 300 is properly set.

The first laser diode emits light, the direction of the emitted light changes while passing through the optical device 311, and the light is received by the first photo diode 312. The first photo diode 312 outputs a current that is proportional to the power of the received light, and the output current is converted into a voltage by the first current-voltage amplifying unit 321.

The voltage output from the first current-voltage amplifying unit 321 passes through the first input variable resistor VR1 and is then amplified while passing through an amplifier 335 of the voltage amplifying circuit 330 in FIG. 3. In FIG. 4, the voltage output from the first current-voltage amplifying unit 321 is amplified while passing through the first voltage amplifying circuit 331. During these procedures, the gain with respect to the voltage output from the first current-voltage amplifying unit 321 is appropriately controlled by adjusting the first input variable resistor VR1 of the voltage amplifying circuit 330 or an input variable resistor VR1 of the first voltage amplifying circuit 331.

After the gain associated with the first laser diode is controlled, the gain associated with the second laser diode is controlled.

The second laser diode emits light, the direction of the emitted light changes while passing through the optical device 311, and the light is received by the second photo diode 313. The second photo diode 313 outputs a current that is proportional to the power of the received light, and the output current is converted into a voltage by the second current-voltage amplifying unit 322.

The voltage output from the second current-voltage amplifying unit 322 passes through the second input variable resistor VR2 and is then amplified while passing through an amplifier 335 of the voltage amplifying circuit 330 in FIG. 3. In FIG. 4, the voltage output from the second current-voltage amplifying unit 322 is amplified while passing through the second voltage amplifying circuit 332. During these procedures, the gain with respect to the voltage output from the second current-voltage amplifying unit 322 is appropriately controlled by adjusting the second input variable resistor VR2 of the voltage amplifying circuit 330 or an input variable resistor VR2 of the second voltage amplifying circuit 332.

When the optical pick-up is used after gain control is completed, the light emitted from the first laser diode is received by the first photo diode 312 through the operation of the optical device 311 passes through the first current-voltage amplifying unit 321, the first input variable resistor VR1 (in the case of FIG. 3) or the first voltage amplifying circuit 331 (in the case of FIG. 4), and is then output after being amplified by the gain controlled in relation to the first laser diode. Similarly, the light emitted from the second laser diode is also output after being amplified by the gain controlled in relation to the second laser diode. During these procedures, there is no need for a gain selection switch that operates with a separate input of a gain selection signal from a control unit.

In the above embodiments, two laser diodes are used. However, it is obvious to those skilled in the art that the present invention can be applied to a case where three or more laser diodes are used, by including photo diodes and current-voltage amplifying circuits corresponding to respective laser diodes.

According to the invention, the FPD has a simple configuration because since the gain selection switch is not needed. Also, since a signal is amplified while traveling in a path physically determined according to the wavelength of the incident light without a need for gain selection, an abnormal operation due to an error in gain selection can be prevented, thereby improving the reliability of the FPD.

While the present invention has been particularly shown and described with reference to exemplary embodiments thereof, it will be understood by those skill in the art that changes may be made in this embodiment without departing from the spirit and principles of the invention, the scope of which is defined in claims and their equivalents.

What is claimed is:

1. A front photo detector for an optical pick-up, comprising:
   a photo diode unit outputting current proportional to a power of light emitted from one of a plurality of laser diodes;
   a current-voltage amplifying circuit converting the current output from the photo diode unit into a voltage; and
   a voltage amplifying circuit amplifying the voltage output from the current-voltage amplifying circuit by a predetermined gain;
   wherein the photo diode unit comprises an optical device changing a direction of the light emitted from one of the plurality of laser diodes and photo diodes receiving light that is emitted from each of the plurality of laser diodes and passes through the optical device,
   the current-voltage amplifying circuit comprises a plurality of current-voltage amplifying units, each of which converts current output from a respective photo diode into a voltage,
   the voltage amplifying circuit separately controls a gain with respect to the current output from the current-voltage amplifying circuit,
   the voltage amplifying circuit comprises at least one amplifier and separate input variable resistors connected to the output of each of the current-voltage amplifying units, and
   the plurality of current-voltage amplifying units and the at least one amplifier receive the same reference voltage input.

2. The front photo detector of claim 1, wherein the voltage amplifying circuit comprises separate amplifiers and input variable resistors connected to the output of each of the current-voltage amplifying units, wherein a first one of the amplifiers is connected to a first one of the current-voltage amplifying units and a second one of the amplifiers is connected to a second one of the current-voltage amplifying unit.

3. The front photo detector of claim 2 wherein the optical device comprises a prism directing light incident through the same path to travel in different paths according to a wavelength of the light.

4. The front photo detector of one of claim 2 wherein the optical device comprises a hologram directing light incident through the same path to travel in different paths according to a wavelength of the light.

5. The front photo detector of one of claim 2 wherein the optical device comprises a grating directing light incident through the same path to travel in different paths according to a wavelength of the light.

6. The front photo detector of claim 1, wherein the optical device comprises a hologram directing light incident through the same path to travel in different paths according to a wavelength of the light.

7. The front photo detector of claim 1, wherein the optical device comprises a grating directing light incident through the same path to travel in different paths according to a wavelength of the light.

8. The front photo detector of claim 1, wherein the optical device comprises a prism directing light incident through the same path to travel in different paths according to a wavelength of the light.

9. A front photo detector apparatus for an optical pickup having an automatic power control circuit operating each of at least one laser diode at a proper power level, comprising:
   a first unit receiving light and outputting a current that is proportional to the power of the received light emitted from each laser diode;

a second unit receiving the output current and adjusting the output current into a voltage that is output to the automatic power control circuit, wherein the front photo detector apparatus does not include a switch for gain selection, the first unit comprises an optical device changing a direction of the light emitted from first and second ones of the laser diodes, wherein wavelengths of the light emitted from first and the second ones of the laser diodes are respectively different such that refractive indices of the light emitted from first and second ones of laser diodes are respectively different, and first and second photo diodes receiving the light emitted from the first and the second laser diode, respectively, the second unit comprises a current-voltage amplifying circuit converting the current output from the first unit into a voltage, and a voltage amplifying circuit amplifying the voltage output from the current-voltage amplifying circuit by a predetermined gain, the current-voltage amplifying circuit comprises first and second current-voltage amplifying units converting the current output from the first and second photo diodes, respectively, and the voltage amplifying circuit comprises first and second variable resistors controlling the gain with respect to the first and second current-voltage amplifying units, respectively, and at least one amplifier and the first and second current-amplifying units receiving the same reference voltage input, wherein the at least one amplifier is connected to the first and second variable resistors.

10. The front photo detector apparatus of claim 9 wherein the at least one amplifier receiving a reference voltage input is a single amplifier connected to the first and second variable resistors.

11. The front photo detector apparatus of claim 9 wherein the at least one amplifier receiving a reference voltage input comprises first and second amplifiers, wherein the first variable resistor is connected by the first amplifier and the second variable resistor is connected to the second amplifier, or vice-versa.

12. The front photo detector apparatus of claim 9 wherein the optical device changing the direction of light emitted from first and second ones of the laser diodes is a hologram directing light incident through a same path to travel in different paths.

13. The front photo detector apparatus of claim 9 wherein the optical device changing the direction of light emitted from first and second ones of the laser diodes is a prism directing light incident through a same path to travel in different paths.

14. The front photo detector apparatus of claim 9 wherein the optical device changing the direction of light emitted from first and second ones of the laser diodes is a grating directing light incident through a same path to travel in different paths.

15. The front photo detector apparatus of claim 9 wherein the light emitted from first and second ones of the laser diodes is to record CD's and DVD's, respectively.

\* \* \* \* \*

UNITED STATES PATENT AND TRADEMARK OFFICE
CERTIFICATE OF CORRECTION

PATENT NO. : 7,636,286 B2
APPLICATION NO. : 10/792917
DATED : December 22, 2009
INVENTOR(S) : Hong-kyu Lee et al.

It is certified that error appears in the above-identified patent and that said Letters Patent is hereby corrected as shown below:

Column 6, Line 38, change "claim 2" to --claim 2,--.

Column 6, Line 39, after "through" change "the" to --a--.

Column 6, Line 42, change "claim 2" to --claim 2,--.

Column 6, Line 44, after "through" change "the" to --a--.

Column 6, Line 46, change "claim 2" to --claim 2,--.

Column 6, Line 48, after "through" change "the" to --a--.

Column 6, Lines 51-52, after "through" change "the" to --a--.

Column 6, Lines 55-56, after "through" change "the" to --a--.

Column 6, Line 59, after "through" change "the" to --a--.

Column 8, Line 3, change "claim 9" to --claim 9,--.

Column 8, Line 7, change "claim 9" to --claim 9,--.

Column 8, Line 13, change "claim 9" to --claim 9,--.

Column 8, Line 18, change "claim 9" to --claim 9,--.

Column 8, Line 22, change "claim 9" to --claim 9,--.

Column 8, Line 26, change "claim 9" to --claim 9,--.

Signed and Sealed this

Sixteenth Day of March, 2010

David J. Kappos
*Director of the United States Patent and Trademark Office*